United States Patent
Li et al.

(10) Patent No.: US 9,824,384 B2
(45) Date of Patent: Nov. 21, 2017

(54) TECHNIQUES FOR LOCATING AN ITEM TO PURCHASE IN A RETAIL ENVIRONMENT

(71) Applicant: WAL-MART STORES, INC., Bentonville, AR (US)

(72) Inventors: Stefan Li, San Francisco, CA (US); Valerie Goulart, Seattle, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 177 days.

(21) Appl. No.: 13/748,496

(22) Filed: Jan. 23, 2013

(65) Prior Publication Data

US 2014/0207615 A1  Jul. 24, 2014

(51) Int. Cl.
G06Q 30/00 (2012.01)
G06Q 30/06 (2012.01)
G06Q 10/04 (2012.01)

(52) U.S. Cl.
CPC ....... *G06Q 30/0623* (2013.01); *G06Q 10/047* (2013.01); *G06Q 30/0639* (2013.01)

(58) Field of Classification Search
CPC ............... G06C 30/06–30/0645; G06C 30/08
USPC ............................................... 705/26.1–27.2
See application file for complete search history.

(56) References Cited

U.S. PATENT DOCUMENTS

| | | | |
|---|---|---|---|
| 6,533,173 B2 | 3/2003 | Benyak | |
| 6,954,735 B1 | 10/2005 | Djupsjobacka | |
| 7,063,263 B2 | 6/2006 | Swartz | |
| 7,309,009 B2 | 12/2007 | Singer-Harter | |
| 7,580,699 B1 | 8/2009 | Shaw | |
| 7,775,430 B2 | 8/2010 | Lin | |
| 2002/0178013 A1 | 11/2002 | Hoffman | |
| 2003/0158650 A1* | 8/2003 | Abe | G08G 1/005 701/420 |
| 2005/0256782 A1 | 11/2005 | Sands | |
| 2008/0228386 A1* | 9/2008 | Geelen et al. | 701/201 |
| 2009/0012704 A1* | 1/2009 | Franco | G01C 21/20 701/532 |
| 2010/0063854 A1 | 3/2010 | Purvis | |
| 2010/0070334 A1* | 3/2010 | Monteverde | G06F 17/30241 705/14.58 |
| 2011/0054780 A1* | 3/2011 | Dhanani | G01C 21/26 701/465 |
| 2011/0106613 A1* | 5/2011 | Felt | G01C 21/00 705/14.46 |

(Continued)

OTHER PUBLICATIONS

Rivkin, J. 2011, "A future in store: the mobile shopping revolution was thought to mark the demise of the physical store. But bricks and mortar will prevail—just with an entirely new outlook", Brand Packaging, vol. 15, No. 1, pp. 10(5).*

*Primary Examiner* — Michael Misiaszek
*Assistant Examiner* — Latasha Ramphal
(74) *Attorney, Agent, or Firm* — Bryan Cave LLP

(57) ABSTRACT

A current location of a portable computerized device can be determined within a retail store. A computer-implemented method to provide a directional aid for a consumer within the store includes receiving an item being sought within a retail store, monitoring, at the processing device, the current location of a portable computerized device, determining an in-store location of the item being sought; and displaying to the consumer a graphic describing a direction and a distance from the current location to the in-store location of the item being sought.

7 Claims, 11 Drawing Sheets

(56) References Cited

U.S. PATENT DOCUMENTS

2011/0178862 A1\*  7/2011  Daigle ............... G06Q 30/0226
                                                                705/14.27
2011/0214082 A1\*  9/2011  Osterhout et al. ............ 715/773
2014/0149033 A1\*  5/2014  Moosavi et al. .............. 701/430

\* cited by examiner

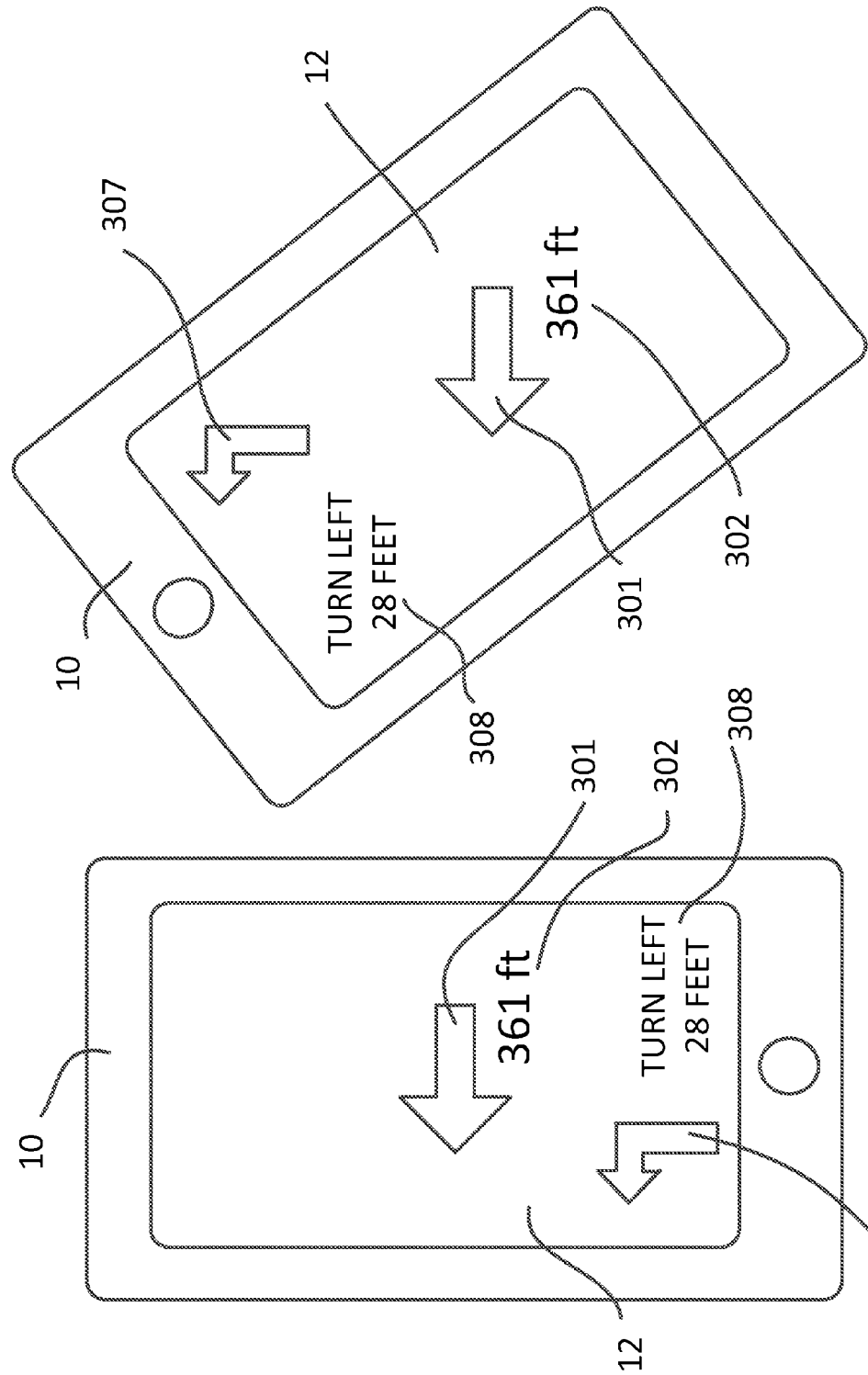

TECHNIQUES FOR LOCATING AN ITEM TO PURCHASE IN A RETAIL ENVIRONMENT

BACKGROUND INFORMATION

Field of the Disclosure

The present invention relates generally to systems and methods for optimizing the shopping experience. In particular, a system is provided to assist a user with locating an item of interest and providing directions to the item based upon a monitored location of the user.

Background

Many consumers visit supermarkets and superstores when shopping for products such as groceries, office supplies, and household wares. Typically, these stores can have dozens of aisles and/or sections. Accordingly, traversing these aisles looking for specific products may be a harrowing experience. Situations may arise where a consumer takes a brute force approach to shopping for products, where the consumer crosses the store multiple times to find all the intended products. Sometimes, a specific product is never found at all and not purchased. Unknown by the customer, a similar product group can be divided among multiple locations, for example, with one type of glue being found in house-wares and another type of glue being found in automotive.

Consumers may use a digital shopping list in order to better organize and remember their items when preparing to go shopping. The consumer may enter such a list at home or at the store.

Computerized devices are known to provide a consumer with access to information such as a shopping list or access to a communication network, such as is enabled by a smart-phone. Computerized devices are also known to include a position sensor, for example, enabling a real-time locating system (RTLS) to determine a substantially accurate location of the device and the associated consumer within the store.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3A illustrates the portable computerized device in a normal orientation; and FIG. 3B illustrates the portable computerized device in a canted orientation, wherein the directional arrow remains oriented toward an absolute location of the product with respect to the device while other graphics on the device remain oriented to the device;

FIGS. 4A and 4B are schematics illustrating the portable computerized device of FIG. 1 with directional arrows assisting a customer to find a product in a store and with additional navigational aids including store layout specific instructions, according to some embodiments of the present disclosure;

FIG. 4A illustrates the portable computerized device in a normal orientation; and FIG. 4B illustrates the portable computerized device in a canted orientation, wherein the directional arrow and the navigational aids remain oriented toward an absolute location of the product with respect to the device;

Figure 1:
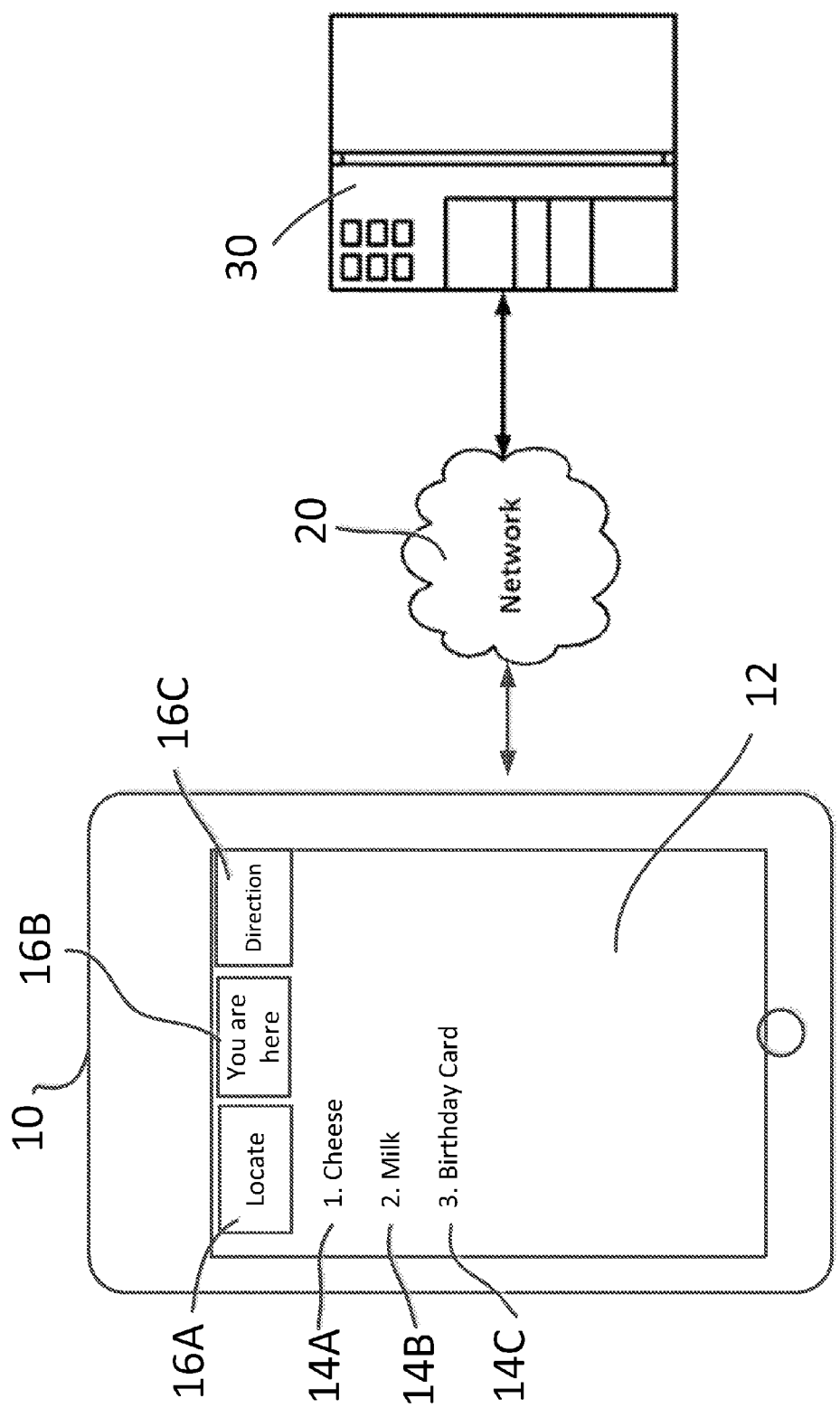
FIG. 1 is a schematic illustrating an exemplary portable computerized device in communication with a product list server via a network, according to some embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Consumers frequently possess portable computerized devices including a position sensor capable of locating the device within a store. A store can maintain a database including accurate locations of products or items within the store. A method can be operated to use the current location of a consumer within the store as monitored by a portable computerized device and the known location of an item or a list of items in the store sought by the consumer to provide the consumer with directions to find the item or items in the store. Directions can include an absolute direction to the item being sought, an absolute distance to the item being sought, a navigation instruction to get to the item being sought, for example, navigating the consumer through the aisles of the store, and a distance required to navigate to the item, for example, providing how far the consumer will need to walk to get to the item including any turns through the store. Graphics representing directions to the consumer can take a number of embodiments. An arrow similar to a compass providing an absolute direction to the item or a next item being sought can be displayed. Navigational arrows describing an upcoming turn at the end of an aisle or describing which aisle should be turned into can be displayed. Textual information can be displayed to the consumer.

A consumer wishing to locate a product within a retail store can utilize many different portable computerized devices. In one embodiment, the user can use a device provided by the retail establishment, the device including a position sensor and a communications device capable of communicating with a server providing information necessary to provide directions through the store. In another embodiment, the user can use his or her own device including a position sensor and having an ability to communicate wirelessly with a server of the store, including, for example, a smart-phone, a tablet computer, or eyeglasses configured to display graphics in a view of the user. Such eyeglasses can be described as a head-mounted display (HMD).

A product list or shopping list for an individual or a list creator can be entered by the consumer at the store or entered prior to arrival at the store and stored within a server device for access by the individual or by others permitted access to the list by the individual. A list can include a single item or a plurality of items. In one embodiment, a shopping list can be impromptu, for example, including a real-time direct product query. A shopper walking down an aisle can remember that she needed Worcestershire sauce and the sauce can be added as a real-time direct product query or a item to be entered and immediately sought. Such a single item can be provisionally or temporarily added to a shopping list, and then the customer can decide whether or not to permanently add the item to a larger shopping list. A shopping list can be a multi-item grocery list, a list of clothes to be purchased, or a list of hardware items for a weekend project. Such a shopping list can be a holiday gift list that the individual is collecting to purchase for a group of other people. The shopping list can be for others to purchase for the individual making the shopping list. The shopping list can include specific products, for example, identified by a specific product code that can be searched for in the store inventory. The shopping list can also include ambiguous products, for example, permitting the individual making the shopping list to capture three different products and record a message saying that he or she would like any one of the three products or an equivalent product. The shopping list can be dynamic, for example, if a consumer decides that she is making a certain recipe while shopping, items corresponding to the recipe can be recalled from a stored list and added to the shopping list. In one embodiment, the shopping list can be available for display on a portable computerized device. The device can also include quick links to aid in navigating to different locations within the store, such as prompts offering "Checkout/exit", "Customer Service", and "Restrooms". Items can be manually removed or checked off a list, or a list can be automatically completed by checking off items as the consumer gets within a certain distance, for example, five feet of an item.

A computerized store database can include records for all of the stores products, including pictures, barcodes, descriptions, cost, weight, location, and inventory. A consumer can query, for example, a total cost that a shopping list will incur at checkout, and the consumer can evaluate in real-time whether an optional item seen at the store is within the shopping budget.

Operation of any portable computerized device or HMD, as disclosed herein, is dependent upon a computerized component. Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand selfservice, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied as any tangible medium of expression having computer-usable program code embodied in the medium.

The software to locate retail products of interest can be owned and controlled by a particular retail establishment. Store control of the program provides for accurate locations of products within the store being available to users of the program. The store is in the best position to provide and maintain an accurate list of products and product locations within the store.

Building and maintaining a database for locating products or specific locations within a store can be accomplished through a number of methods. For example, a store can maintain such a location database for assisting store personnel in stocking and auditing the store inventory. In such an event, the already existing database could be adapted for use with the methods disclosed herein.

Products on a list, even a list of just one, can be used to form a shopping list for a shopper to find store locations of products of interest. Directions to an item of interest can include textual instructions, graphics superimposed upon an illustrated map of the store, or a directional arrow pointing in an absolute direction of an item being sought. In one embodiment, this shopping list can be used with augmented reality programs to guide the shopper in the store to the right product(s). Augmented reality permits descriptive graphics to be presented upon an actual view of the consumer, for example, as visible through an HMD or superimposed upon a camera feed available to the consumer. Augmented reality can, for example, present a graphic of an arrow superimposed upon a floor of the store, present a virtual clerk leading the shopper to the item, present a trail of virtual bread crumbs upon the floor for the consumer to follow, a graphic pointing to a particular area on a shelf when the product should be visible, or any other graphics to lead the shopper through the store.

Hardware and software configurations of the systems disclosed herein can take many different embodiments. The necessary software can be preloaded upon portable devices owned by the retail establishment and loaned a customer. Customers can download applications onto their smartphones or other portable devices and utilize the software in that manner. An augmented reality program can be installed upon a portable store-owned computerized device or customer owned device. In another embodiment, a portable computerized device can include an augmented reality program configured permanently to the hardware of the device. In one embodiment, a single product location index server can be utilized remotely to provide product locations in a plurality of stores, with communication of necessary information being transferred over a communications network. In another embodiment, a single remotely operated product location index server can be used to provide product locations for a single store. In one embodiment, a remote server can be used as a product location index server, and a second, local, in-store server can be used to permit local wireless communication between customers and the local server. In another embodiment, a product location index server can be local to a store. Communication between portable computerized devices and a product location index server can be over a cellular network, over a local network operated by the store, or by other communications methods known in the art.

Products can be added to a list according to any input device known in the art. In one example, a real-time direct product query can be initiated by shopper speaking the name of the item or typing in the name of the item.

Referring now to FIG. 1, a portable computerized device 10 is illustrated in communication with a product location index server 30 via a network 20. Portable computerized device 10 can configured to allow a user to input a product, for example, item 14A. In some embodiments, as shown in the illustrative example, the portable computerized device 10 is displaying a graphical user interface (GUI) 12 configured as a touch screen device that is displaying an electronic shopping list comprised of a plurality of items, e.g., item 14A, item 14B, and item 14C. Embodiments disclosed herein can employ portable computerized devices, but it will be appreciated that many similar embodiments can be employed to include a stationary device configured to provide directions to a product or a department within the store or a series of stationary devices located throughout the store configured to sequentially lead a customer to a item being sought.

The GUI 12 further includes a plurality of input objects, which allow the user to provide commands to portable computerized device 10. The input objects include a "locate" input object 16A. In one exemplary use, a tap of a finger upon item 14A will highlight the item, and a subsequent tap of a finger upon object 16A will generate a command to the device to provide directions to item 14A. In one embodiment, device 10 queries information necessary to provide a direction to the item from server 30, and product location index server 30 returns the product location to the portable computerized device 10, displayed to the user on a map of the store via GUI 12. In one embodiment, the multiple product locations in the store can be displayed to the user on a map of the store via the portable computerized device 10 via GUI 12. In some embodiments, the product location in the store can be depicted as an alphanumeric symbol and displayed on a map on portable computerized device 10. In some embodiments, the product location in the store can be depicted as an icon and displayed on a map on portable computerized device 10. In one embodiment, a directional arrow can be displayed to the user on the portable computerized device 10 via GUI 12. Further details of each of these views are shown in additional figures.

The you-are-here object 16B, when pressed by the user, initiates an instruction to the computing device 10, which displays an in-store map including an icon depicting the user's location on the GUI on the computing device 10.

The direction input object 16C, when pressed by the user, initiates an instruction to the portable computerized device 10 to display a symbol to the user indicating the current location of the user within the store. In some embodiments, an arrow may point from the user's location, displayed to the user on a map of the store via GUI 12 on the computing device 10, to the direction of the selected products symbol location on the GUI on the computing device 10. In some embodiments, this depiction can be an icon while in others an alphanumeric symbol. In some embodiments, a direction command will provide a large arrow graphic upon device 10, wherein the arrow points in an absolute direction to the item being sought. In such an embodiment, the device acts like a compass, but the arrow points to an item being sought instead of pointing to magnetic north.

Figure 2:
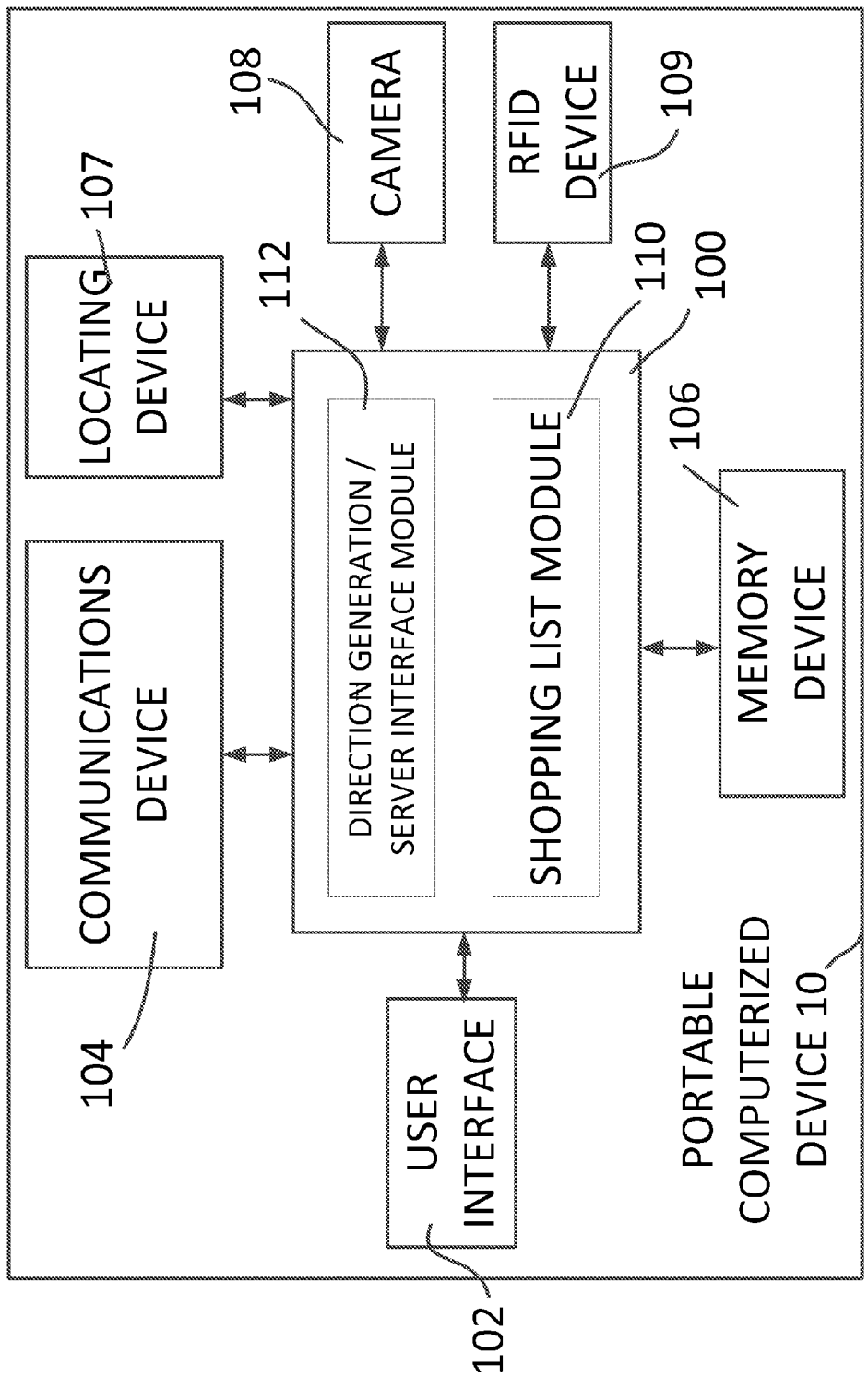
FIG. 2 is a schematic illustrating exemplary components of the portable computerized device of FIG. 1, according to some embodiments of the present disclosure.

Referring now to FIG. 2, a schematic illustrating exemplary components of portable computerized device of FIG. 1 is illustrated. In the illustrative embodiment, the portable computerized device includes a processing device 100, a user interface 102, communication device 104, a memory device 106, a locating device 107, a camera device 108, and a Radio Frequency Identification Device (RFID) 109. It is noted that the portable computerized device 10 can include other components and some of the components are not required.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the portable computerized device 10. In the illustrative embodiment, the processing device 100 also executes a shopping list module 110 and an direction generation/server interface module 112, which are described in greater detail below.

User interface 102 is a device that allows a user to interact with the portable computerized device 10. While one user interface 102 is shown, the term "user interface" can include, but is not limited to, a touch screen, a physical keyboard, a mouse, a microphone, and/or a speaker. The communication device 104 is a device that allows the portable computerized device 10 to communicate with another device, e.g., the product location index server 30, via the network 20.

The communication device 104 can include one or more wireless transceivers for performing wireless communication and/or one or more communication ports for performing wired communication.

The memory device 106 is a device that stores data generated or received by the portable computerized device 10. Memory device 106 can include, but is not limited to, a hard disc drive, an optical disc drive, and/or a flash memory drive.

The locating device 107 determines a location of the portable computerized device 10 according to methods known in the art. According to one embodiment, locating device can include an RTLS device, for example, utilizing cell phone tower signals to determine a location of the device.

The camera 108 is a digital camera that captures a digital photograph. Camera 108 receives an instruction to capture an image, captures an image of an object, i.e., a handwritten shopping list, and outputs the digital photograph. The digital photograph can be a bitmap file. The bitmap file can be a bitmap, a JPEG, a GIF, or any other suitably formatted file. The camera 108 can receive the instruction to capture the image from the processing device 100 and can output the digital photograph to the processing device 100.

The Radio Frequency Identification Device (RFID) 109 can determines the location of the portable computerized device 10 by triangulating positions by using Radio Frequency Identification Device (RFID) radio signals from small transmitters placed throughout a building in known locations. In another embodiment, RFID device 109 can determine proximity of the device to a mobile feature, such as a store clerk, or proximity to a temporary or one-time display not loaded into the product location index server 30.

The shopping list module 110 allows a user to input a single item or to generate an electronic shopping list and displays the electronic shopping list to the user in the GUI 12 via user interface 102. The shopping list module 110 may be configured to generate the electronic shopping list based on items manually entered by the user, a photograph of a handwritten shopping list, previous electronic shopping lists stored by the user and/or a purchase history of the user. The shopping list module 110 can display the item of interest or generate an electronic shopping list in any other suitable manner.

Direction generation/server interface module 112 processes information related to providing directions to the user and interfaces with server 30 to generate graphics upon a display related to the directions. Computation of distances, directions, navigational directions between and around aisles can be generated in module 112 or within server 30.

Figures 3A, 3B:
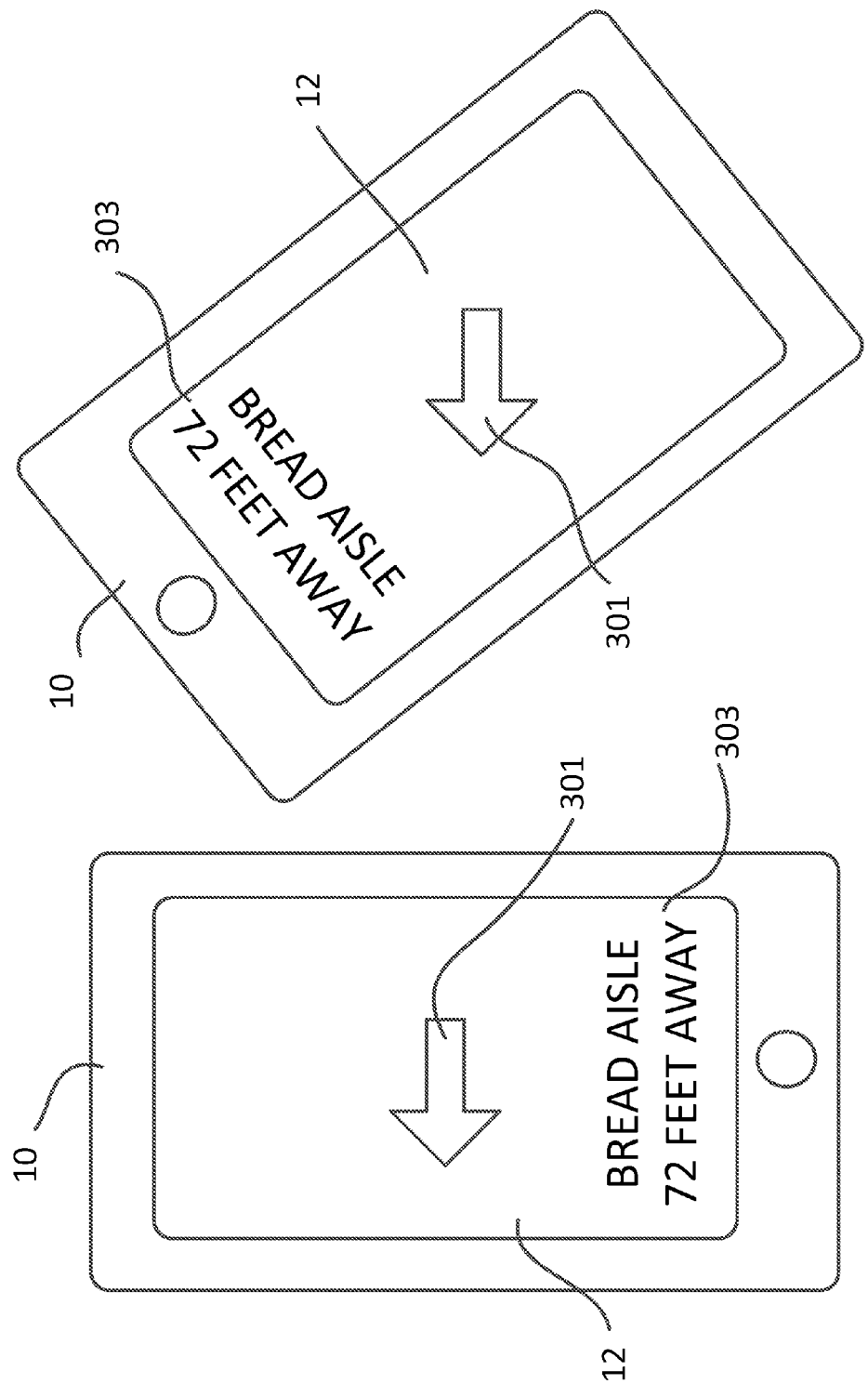
FIGS. 3A and 3B are schematics illustrating the portable computerized device of FIG. 1 with directional arrows assisting a customer to find a product in a store, according to some embodiments of the present disclosure.

FIGS. 3A and 3B are schematics illustrating the portable computerized device of FIG. 1 with directional arrows assisting a customer to find a product in a store. FIG. 3A illustrates the portable computerized device in a normal orientation.

FIG. 3B illustrates the portable computerized device in a canted orientation, wherein the directional arrow remains oriented toward an absolute location of the product with respect to the device while other graphics on the device remain oriented to the device. FIG. 3A illustrates an exemplary embodiment of the portable computerized device 10 with a directional arrow 301 shown on GUI 12, that points in the direction in the store of the selected product 350. In some embodiments, the directional arrow 301 can turn red if the user begins to move in a direction away from location of selected product 350, and otherwise remain green. In this way, the user can reference his or her location to better navigate through the store. It is noted that the example directional arrow 301 is provided for example and not intended to be limiting. Textual graphic 303 is illustrated, identifying the item or range of items being sought and, in this exemplary embodiment, an absolute distance from the current location of the user to the item.

FIG. 3B illustrates the portable computerized device in a canted orientation, wherein the directional arrow remains oriented toward an absolute location of the product with respect to the device while other graphics on the device remain oriented to the device. FIG. 3B illustrates an exemplary embodiment of the portable computerized device 10 with a directional arrow 301 shown on GUI 12, that points in the direction in the store of the selected product 350. Because directional arrow 301 is determined as an absolute direction to the item, a user rotating or canting the device will see the arrow continuing to point at a distinct location within the store. Textual graphic 303 is configured to remain in a fixed orientation in relation to device 10.

FIGS. 4A and 4B are schematics illustrating the portable computerized device of FIG. 1 with directional arrows assisting a customer to find a product in a store and with additional navigational aids including store layout specific instructions. FIG. 4A illustrates the portable computerized device in a normal orientation, including directional arrow 301, textual graphic 302 providing an absolute distance to the item being sought, navigational arrow 307 providing an illustration of a next turn to be taken within the store, for example, at the end of a current aisle, and textual navigation instruction 308 providing a corresponding instruction to arrow 307.

FIG. 4B illustrates the portable computerized device in a canted orientation, wherein the directional arrow and the navigational aids remain oriented toward an absolute location of the product with respect to the device. In one embodiment, graphics can be displayed such that the presented information is always oriented toward a vertical direction, as if the display were directed by gravity. In another embodiment, the display can snap to a closest orthogonal direction, squaring up with a side of the display closest to the vertical orientation. Each of arrows 301 and 307 and textual graphics 302 and 308 are illustrated oriented in a vertical direction relative to the device and maintaining correction orientations with respect to the item being sought.

Figure 11:
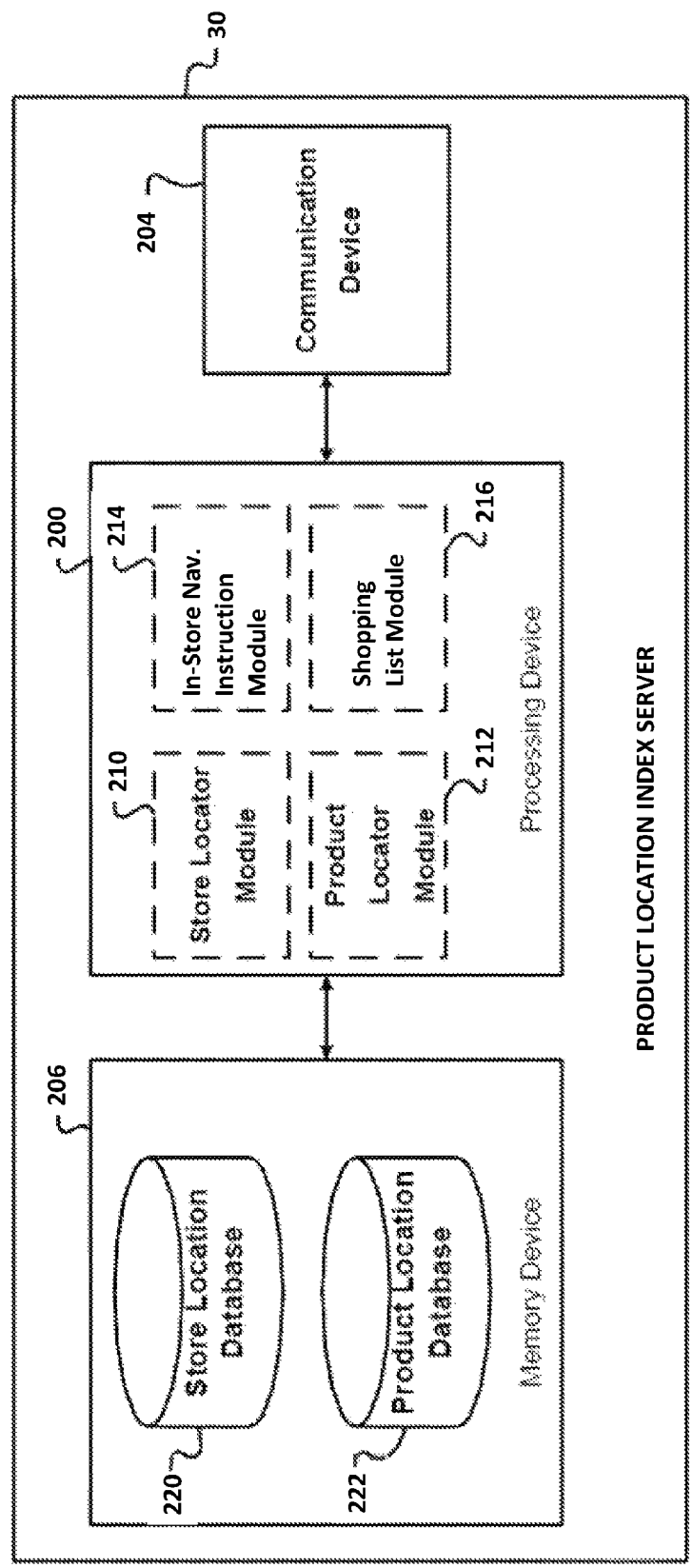
FIG. 11 is a schematic illustrating an exemplary product location index server, according to some embodiments of the present disclosure.

FIG. 11 is a schematic illustrating an exemplary product location index server. In the illustrated embodiment, the product location index server 30 may include a processing device 200, a communication device 204, and memory device 206.

The processing device 200 can include memory, e.g., read only memory (ROM) and random access memory (RAM), storing processor-executable instructions and one or more processors that execute the processor-executable instructions. In embodiments where the processing device 300 includes two or more processors, the processors can operate in a parallel or distributed manner. In the illustrative embodiment, the processing device 200 executes one or more of a store locator module 210, a product locator module 212, a in-store navigation instruction module 214, and a shopping module 216.

The communication device 204 is a device that allows the product location index server 30 to communicate with another device, e.g., the portable computerized device, via the network 20. The communication device 204 can include one or more wireless transceivers for performing wireless communication and/or one or more communication ports for performing wired communication.

The memory device 206 is a device that stores data generated or received by the product location index server 30. The memory device 206 can include, but is not limited to a hard disc drive, an optical disc drive, and/or a flash memory drive. Further, the memory device 206 may be distributed and located at multiple locations. The memory device 206 is accessible to the processing device 200. In some embodiments, the memory device 206 stores a store location database 220 and a product location database 222.

In some embodiments, the store location database 220 can store the store locations of one or more stores operated or associated with a retailer. The store location database 220 may be queried using a specific location, e.g., GPS coordinates, or a general location, e.g., postal zip code or city/state, and can return one or more stores that are proximate to the specific or general location. The store location database 220 may further be configured to store maps corresponding to each store location. The store location database 220 may be queried with a store location and can return the store map corresponding to the store location.

In some embodiments, the product location database 222 stores product waypoints indicating locations of the products sold by a retailer in the one or more stores operated or associated with the retailer. For example, the product location database 222 may store the location of "milk" in each of the stores operated or associated with the retailer. The product location database 222 may be queried with the item "milk" and a specific store location, and may return a waypoint indicating the location of "milk" at the specific store location.

The product location database 222 may be configured to store waypoints for specific products and generic products. For example, the product location database 222 may be configured to store waypoints indicating the location of "ice cream," a generic product, and the location of "BEN AND JERRY'S® ice cream," a specific product. It should be noted that a waypoint corresponding to a generic product or specific product may be represented using a starting location and ending location. For example, a waypoint corresponding to "ice cream" may indicate where the ice cream section begins and where the "ice cream" section ends. Similarly, a waypoint corresponding to "BEN AND JERRY'S® ice cream" may indicate where the BEN AND JERRY'S® ice cream begins and ends. It should be appreciated that when a specific product is a species of a generic product, e.g., BEN AND JERRY'S® ice cream is a species of "ice cream," the waypoint corresponding to a specific product may be wholly contained within the waypoint corresponding to the generic product. In some embodiments, a generic product may be located in more than one location in the store. For example, milk may be located in the dairy section, while organic milk may be located in the natural foods location. In this type of scenario, the product location database 222 may store more than one location for milk. When such a situation arises, the product locator module 212 may retrieve multiple product waypoints, such that the multiple waypoints corresponding to the generic product are provided to the portable computerized device. A navigation graphic may, for example, highlight an entire region defined by a series of waypoints for a particular object being sought (the whole area in front of the ice cream cooler) or a single point in front of a particular product (the BEN AND JERRY'S® ice cream section.)

The product location database 222 may further store a type of each product sold by the retailer, e.g., groceries, home décor, and personal goods, and/or a section of the product, e.g., dairy or men's clothing. Furthermore, the types and/or sections can be stored relative to each store location. In this way, the product location database 222 can be queried with a store location and a product and can return a type of the product and/or a section of the product at the store location.

As discussed, the processing device 200 may execute the store locator module 210. The store locator module 210 receives a location from the portable computerized device and determines one or more store locations corresponding to the received location. In some embodiments, the store locator module 210 queries the store location database 220 with the received location and receives one or more store locations that correspond to the received location. For example, the store location database 320 may return any store locations that are within a predetermined distance, e.g., 10 miles, from the received location. When more than one store location is received, the store locator module 210 may automatically select the store location nearest to the received location or may provide the store locations to the portable computerized device, thereby allowing the portable computerized device or the user to select the store location.

The product locator module 212 receives an object being sought and determined a location in the store or a set of waypoints in the store associated with the object being sought. Product locator module 212 can provide the object location to in-store navigation instruction module 214 such that instructions can be provided to user regarding directions to an item or list of items. In-store navigation instruction module 214 can process in isolation or in combination with a module in the portable computerized device information related to the location of the user, locations of items being sought, navigational data for the store, and other priorities such as preferences of the user to determine an appropriate direction or set of directions to provide to the user.

Figure 5:
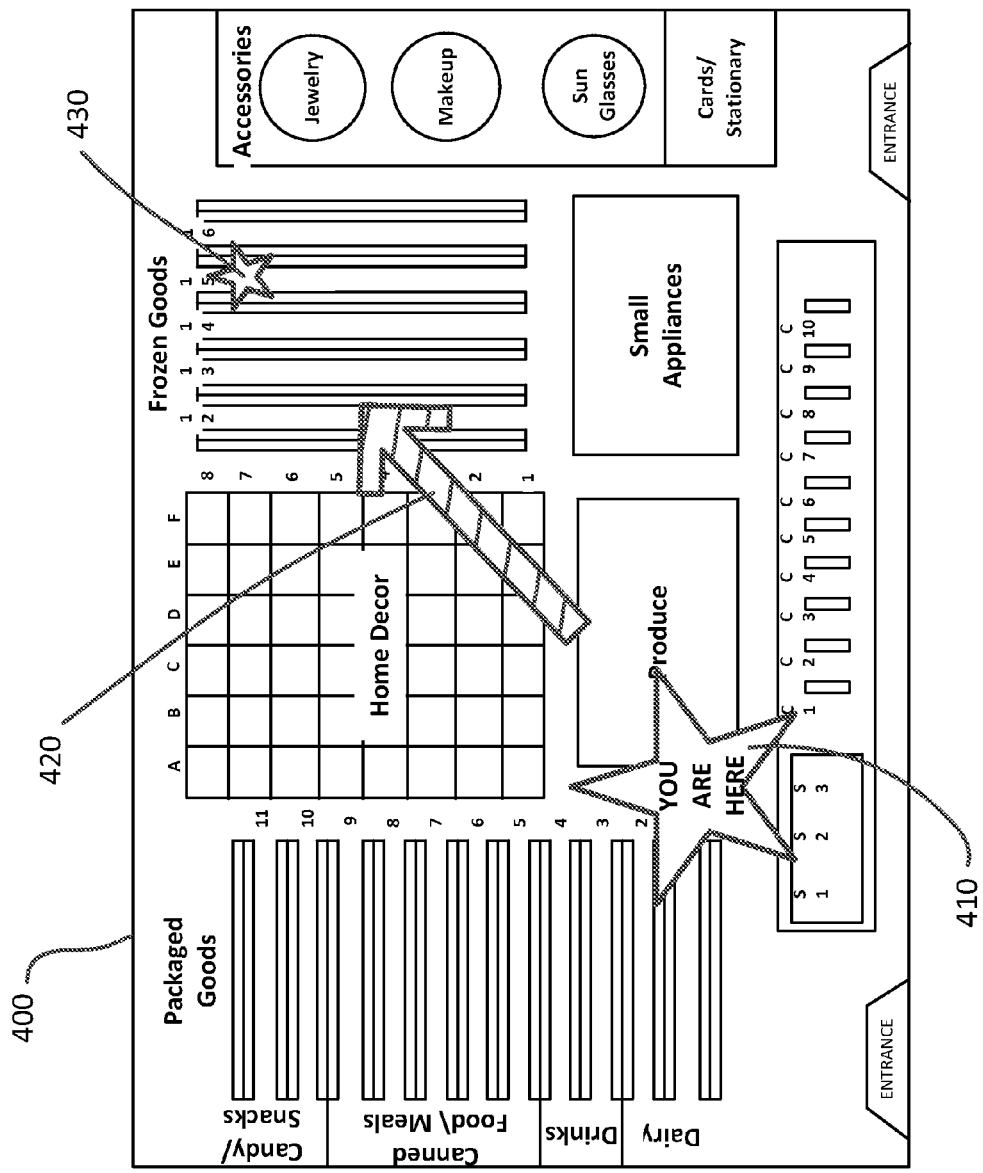
FIG. 5 is an illustration of an exemplary graphic that can be presented to a user including a map of the store, a present location of the user, a location within the store of an item being sought, and a directional arrow representing a relative position of the item with respect to the user, according to some embodiments of the present disclosure.

FIG. 5 illustrates an exemplary map 400 displayed on a portable computerized device. In this embodiment, a map of the interior of a retail store is shown. A star depicts a "You-Are-Here" icon 410, and the selected product is depicted by product icon 430. Directional arrow 420 illustrates a direction one would travel on the map to get directly from icon 410 to icon 430. In some embodiments, only product icon 430 is displayed on the display. In other embodiments, both product icon 430 and You-Are-Here icon 410 are displayed. In one embodiment, the entire shopping list can be illustrated as icons displayed across map 400, and the user can prompt for a navigational route through the store to be automatically plotted, or the user can tap items in sequence to program a navigation route through the store.

Figure 6:
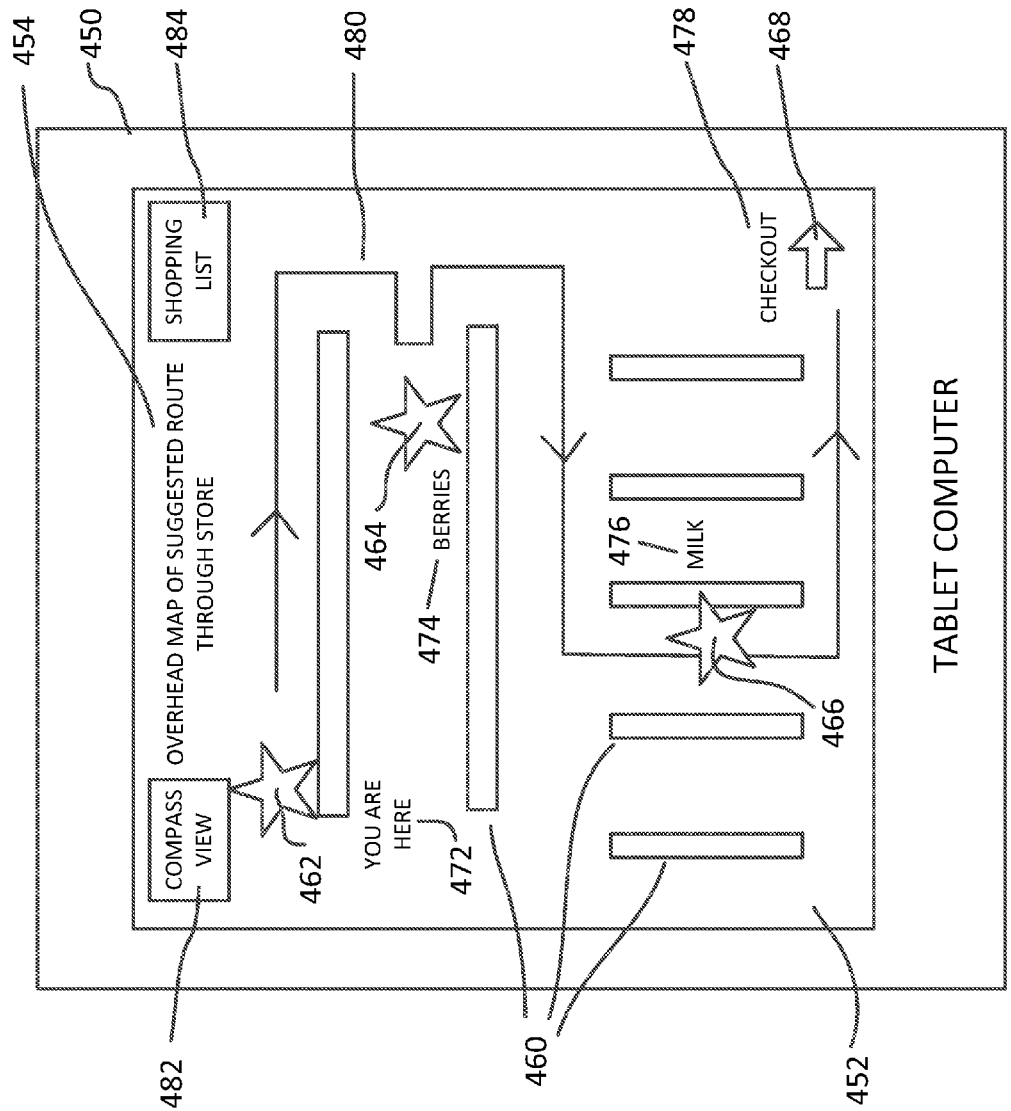
FIG. 6 illustrates an exemplary graphic that can be presented to a consumer, illustrating a layout of a store, locations of items being sought within the store, and a proposed route through the store to acquire the items being sought, according to some embodiments of the present disclosure.

FIG. 6 illustrates an exemplary graphic that can be presented to a consumer, illustrating a layout of a store, locations of items being sought within the store, and a proposed route through the store to acquire the items being sought. A portable computerized device embodied as a tablet computer 450 is illustrated including display screen 452. Store features 460 including lines of shelves forming aisles within the store are illustrated. Banner 454 announces to a user of the device a purpose of the displayed graphic. A user of tablet computer 450 holding the computer can be located based upon a position sensor within the computer. The location of the user is displayed upon the display as star icon 462 and textual graphic 472. Locations of items on a shipping list are displayed as star icons 464 and 466 and textual graphics 474 and 476, respectively. A location of a checkout in the store is displayed as arrow icon 468 and textual graphic 478. Based upon the location of the user, the locations of the items being sought, a geometry of the store created by features 460, and a location of the checkout, a most efficient path through the store can be determined and displayed as suggested route graphic 480. Determination of a suggested route can be based upon a shortest total route traveled, a route avoiding high traffic areas, a route traveling past areas preferred by the customer, for example, with the customer entering preferences stating that he likes to go past the coffee and fresh fruit aisles even when nothing on the list suggests such a route. Additional functions are made available to the user through buttons 482 and 484, for example, permitting the user to switch to a directional compass view as illustrated in FIG. 3 or permitting the user to view or edit the shopping list, respectively.

Figure 7:
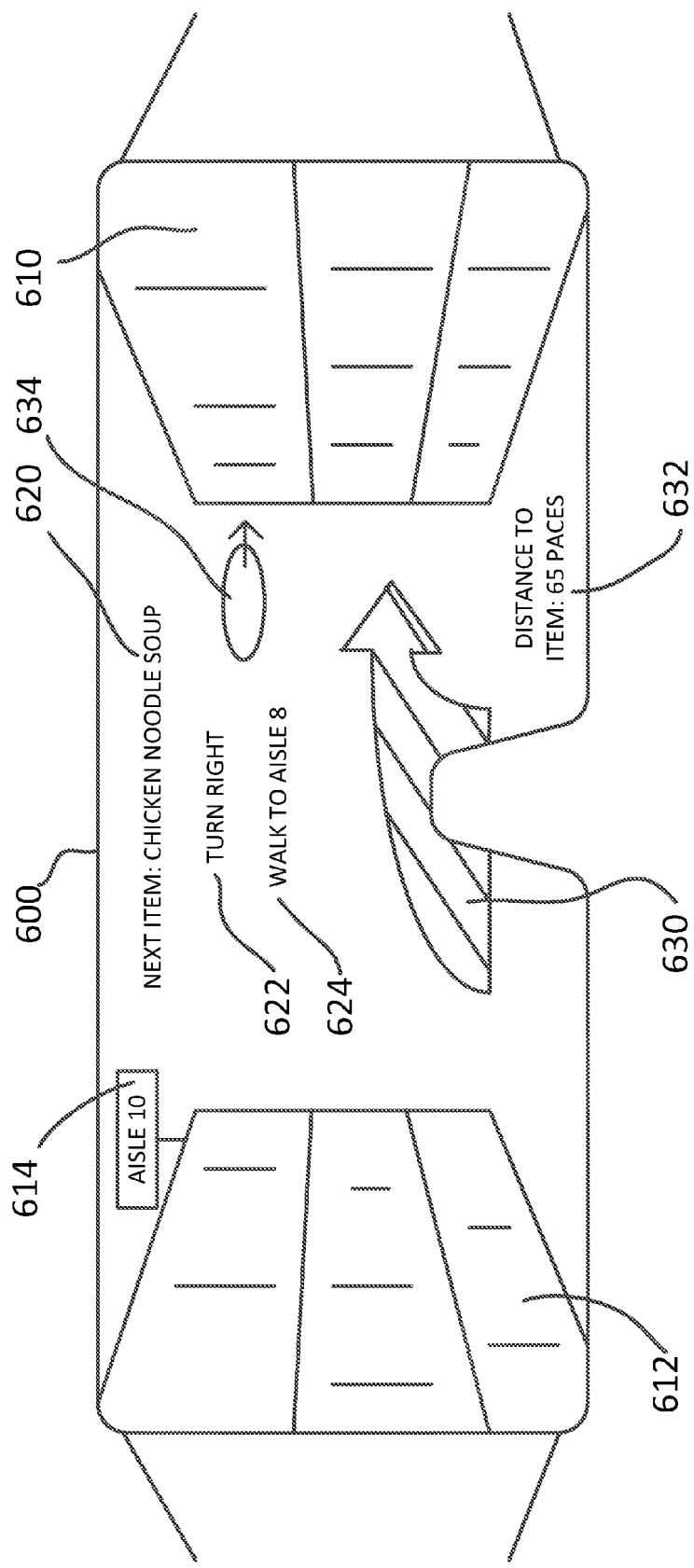
FIG. 7 is a schematic illustrating exemplary eyeglasses configured to present graphics in a view of a user, the graphics providing directional and navigational instructions to the user to reach an item within a store, according to some embodiments of the present disclosure.

FIG. 7 is a schematic illustrating exemplary eyeglasses configured to present graphics in a view of a user, the graphics providing directional and navigational instructions to the user to reach an item within a store. A portable computerized device embodied as eyeglasses 600 can be configured to provide directions to a user based upon a location of eyeglasses 600 and an in-store location of an item being sought. Eyeglasses 600 permit the user to view items proximate to the user, for example, store shelves 610 and 612 and aisle sign 614. Eyeglasses 600 can operate an augmented reality program to project graphics upon the view of the user, providing information in the context of the view. FIG. 7 illustrates a navigational arrow 630 instructing the user where to walk once the user gets past shelf 610. Textual graphics 620, 622, and 624 provide additional information to the user, including an identification of the next item being sought, a next navigational instruction, and a description of the overall navigation operation being performed, respectively. Additionally, a gyro-compass graphic 634 is presented, providing an absolute direction to the next item being sought, and textual graphic 632 provides a navigation distance to the next item, wherein the distance has been calibrated to a number of paces for the user.

Figure 9:
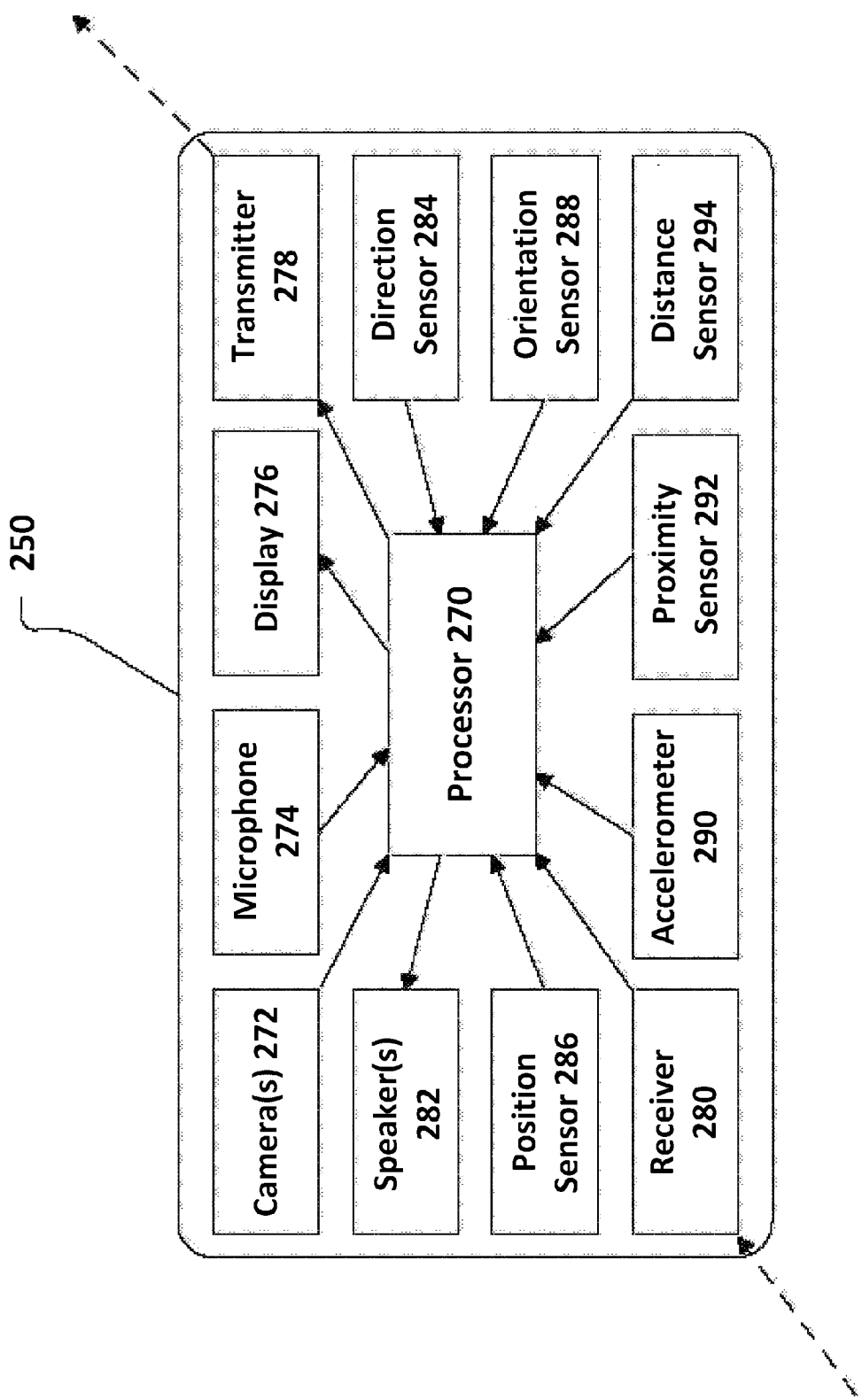
FIG. 9 is a schematic illustrating exemplary components of the portable computerized device embodied as eyeglasses configured to present graphics in a view of a user, according to some embodiments of the present disclosure.

FIG. 9 is a block diagram illustrating exemplary components of the portable computerized device 250. Portable computerized device 250 can include exemplary eyeglasses attached to a head mount unit configured to display graphics in a view of a user. The portable computerized device can include a processor 270, one or more cameras 272, a microphone 274, a display 276, a transmitter 278, a receiver 280, one or more speakers 282, a direction sensor 284, a position sensor 286, an orientation sensor 288, an accelerometer 290, a proximity sensor 292, and a distance sensor 294.

The processor 270 can be operable to receive signals generated by the other components of the portable computerized device 250. The processor 270 can also be operable to control the other components of the portable computerized device 250. The processor 270 can also be operable to process signals received by a device configured as a head mount unit. While one processor 270 is illustrated, it should be appreciated that the term "processor" can include two or more processors that operate in an individual or distributed manner.

The a head mount unit can include one or more cameras 272. Each camera 272 can be configured to generate a video signal. One of the cameras 272 can be oriented to generate a video signal that corresponds to the field of view of the consumer wearing the head mount unit. Each camera 272 can be operable to capture single images and/or video and to generate a video signal based thereon. The video signal may be representative of the field of view of the consumer wearing the head mount unit.

In some embodiments of the disclosure, cameras 272 may be a plurality of forward-facing cameras 272. In such embodiments, the orientation of cameras 272 can be known and the respective video signals can be processed to triangulate an object with both video signals. This processing can be applied to determine the distance that the consumer is spaced from the object. Determining the distance that the consumer is spaced from the object can be executed by the processor 270 or by a commerce server using known distance calculation techniques.

Processing of the one or more, forward-facing video signals can also be applied to determine the identity of the object. Determining the identity of the object, such as the identity of a product in the retail store, can be executed by the processor 270 or by the commerce server. If the processing is executed by the commerce server, the processor 270 can modify the video signals to limit the transmission of data back to commerce server. For example, the video signal can be parsed and one or more image files can be transmitted to the commerce server instead of a live video feed. Further, the video can be modified from color to black and white to further reduce transmission load and/or ease the burden of processing for either the processor 270 or the commerce server.

In some embodiments of the present disclosure, the cameras 272 can include one or more inwardly-facing cameras directed toward the consumer's eyes. A video signal revealing the consumer's eyes can be processed using eye tracking techniques to determine the direction that the consumer is viewing. In one example, a video signal from an inwardly-facing camera can be correlated with one or more forward-facing video signals to determine the object the consumer is viewing.

The microphone 274 can be configured to generate an audio signal that corresponds to sound generated by and/or proximate to the consumer. The audio signal can be processed by the processor 270 or by the commerce server. For example, verbal signals can be processed by the commerce server such as "this product appears interesting." Such audio signals can be correlated to the video recording.

The display 276 can be positioned within the consumer's field of view. Video content can be shown to the consumer with the display 276. The display 282 can be configured to display text, graphics, images, illustrations and any other video signals to the consumer. The display 276 can be a transparent when not in use and partially transparent when in use to minimize the obstruction of the consumer's field of view through the display 276.

The transmitter 278 can be configured to transmit signals generated by the other components of the portable computerized device 250 from the head mount unit. The processor 270 can direct signals generated by components of the portable computerized device 250 to the commerce sever through the transmitter 278. The transmitter 278 can be an electrical communication element within the processor 270. In one example, the processor 270 is operable to direct the video and audio signals to the transmitter 278 and the transmitter 278 is operable to transmit the video signal and/or audio signal from the head mount unit, such as to the commerce server through a communications network.

The receiver 280 can be configured to receive signals and direct signals that are received to the processor 270 for further processing. The receiver 280 can be operable to receive transmissions from the network and then communicate the transmissions to the processor 270. The receiver 280 can be an electrical communication element within the processor 270. In some embodiments of the present disclosure, the receiver 280 and the transmitter 278 can be an integral unit.

The transmitter 278 and receiver 280 can communicate over a Wi-Fi network, allowing the head mount device to exchange data wirelessly (using radio waves) over a computer network, including high-speed Internet connections. The transmitter 278 and receiver 280 can also apply Bluetooth® standards for exchanging data over short distances by using short-wavelength radio transmissions, and thus creating personal area network (PAN). The transmitter 278 and receiver 280 can also apply 3G or 4G, which is defined by the International Mobile Telecommunications-2000 (IMT-2000) specifications promulgated by the International Telecommunication Union.

The head mount unit can include one or more speakers 282. Each speaker 282 can be configured to emit sounds, messages, information, and any other audio signal to the consumer. The speaker 282 can be positioned within the consumer's range of hearing. Audio content transmitted by the commerce server can be played for the consumer through the speaker 282. The receiver 280 can receive the audio signal from the commerce server and direct the audio signal to the processor 270. The processor 270 can then control the speaker 282 to emit the audio content.

The direction sensor 284 can be configured to generate a direction signal that is indicative of the direction that the consumer is facing. The direction signal can be processed by the processor 270 or by the commerce server. For example, the direction sensor 284 can electrically communicate the direction signal containing direction data to the processor 270 and the processor 270 can control the transmitter 278 to transmit the direction signal to the commerce server through the network. By way of example and not limitation, the direction signal can be useful in determining the identity of a product(s) visible in the video signal, as well as the location of the consumer within the retail store.

The direction sensor 284 can include a compass or another structure for deriving direction data. For example, the direction sensor 284 can include one or more Hall effect sensors. A Hall effect sensor is a transducer that varies its output voltage in response to a magnetic field. For example, the sensor operates as an analog transducer, directly returning a voltage. With a known magnetic field, its distance from the Hall plate can be determined. Using a group of sensors disposing about a periphery of a rotatable magnetic needle, the relative position of one end of the needle about the periphery can be deduced. It is noted that Hall effect sensors can be applied in other sensors of the head mountable unit.

The position sensor 286 can be configured to generate a position signal indicative of the position of the consumer within the retail store. The position sensor 286 can be configured to detect an absolute or relative position of the consumer wearing the head mountable unit. The position sensor 286 can electrically communicate a position signal containing position data to the processor 270 and the processor 270 can control the transmitter 278 to transmit the position signal to the commerce server through the network.

Identifying the position of the consumer can be accomplished by radio, ultrasound or ultrasonic, infrared, or any combination thereof. The position sensor 286 can be a component of a real-time locating system (RTLS), which is used to identify the location of objects and people in real time within a building such as a retail store. The position sensor 286 can include a tag that communicates with fixed reference points in the retail store. The fixed reference points can receive wireless signals from the position sensor 286. The position signal can be processed to assist in determining one or more products that are proximate to the consumer and are visible in the video signal.

The orientation sensor 288 can be configured to generate an orientation signal indicative of the orientation of the consumer's head, such as the extent to which the consumer is looking downward, upward, or parallel to the ground. A gyroscope can be a component of the orientation sensor 288. The orientation sensor 288 can generate the orientation signal in response to the orientation that is detected and communicate the orientation signal to the processor 270. The orientation of the consumer's head can indicate whether the consumer is viewing a lower shelf, an upper shelf, or a middle shelf.

The accelerometer 290 can be configured to generate an acceleration signal indicative of the motion of the consumer. The acceleration signal can be processed to assist in determining if the consumer has slowed or stopped, tending to indicate that the consumer is evaluating one or more products for purchase. The accelerometer 290 can be a sensor that is operable to detect the motion of the consumer wearing the head mountable unit. The accelerometer 290 can generate a signal based on the movement that is detected and communicate the signal to the processor 270. The motion that is detected can be the acceleration of the consumer and the processor 270 can derive the velocity of the consumer from the acceleration. Alternatively, the commerce server can process the acceleration signal to derive the velocity and acceleration of the consumer in the retail store.

The proximity sensor 292 can be operable to detect the presence of nearby objects without any physical contact. The proximity sensor 292 can apply an electromagnetic field or a beam of electromagnetic radiation such as infrared and assess changes in the field or in the return signal. Alternatively, the proximity sensor 292 can apply capacitive photoelectric principles or induction. The proximity sensor 292 can generate a proximity signal and communicate the proximity signal to the processor 270. The proximity sensor 292 can be useful in determining when a consumer has grasped and is inspecting a product.

The distance sensor 294 can be operable to detect a distance between an object and the head mount unit. The distance sensor 294 can generate a distance signal and communicate the signal to the processor 270. The distance sensor 294 can apply a laser to determine distance. The direction of the laser can be aligned with the direction that the consumer is facing. The distance signal can be useful in determining the distance to an object in the video signal generated by one of the cameras 272, which can be useful in determining the consumer's location in the retail store.

Figure 10:
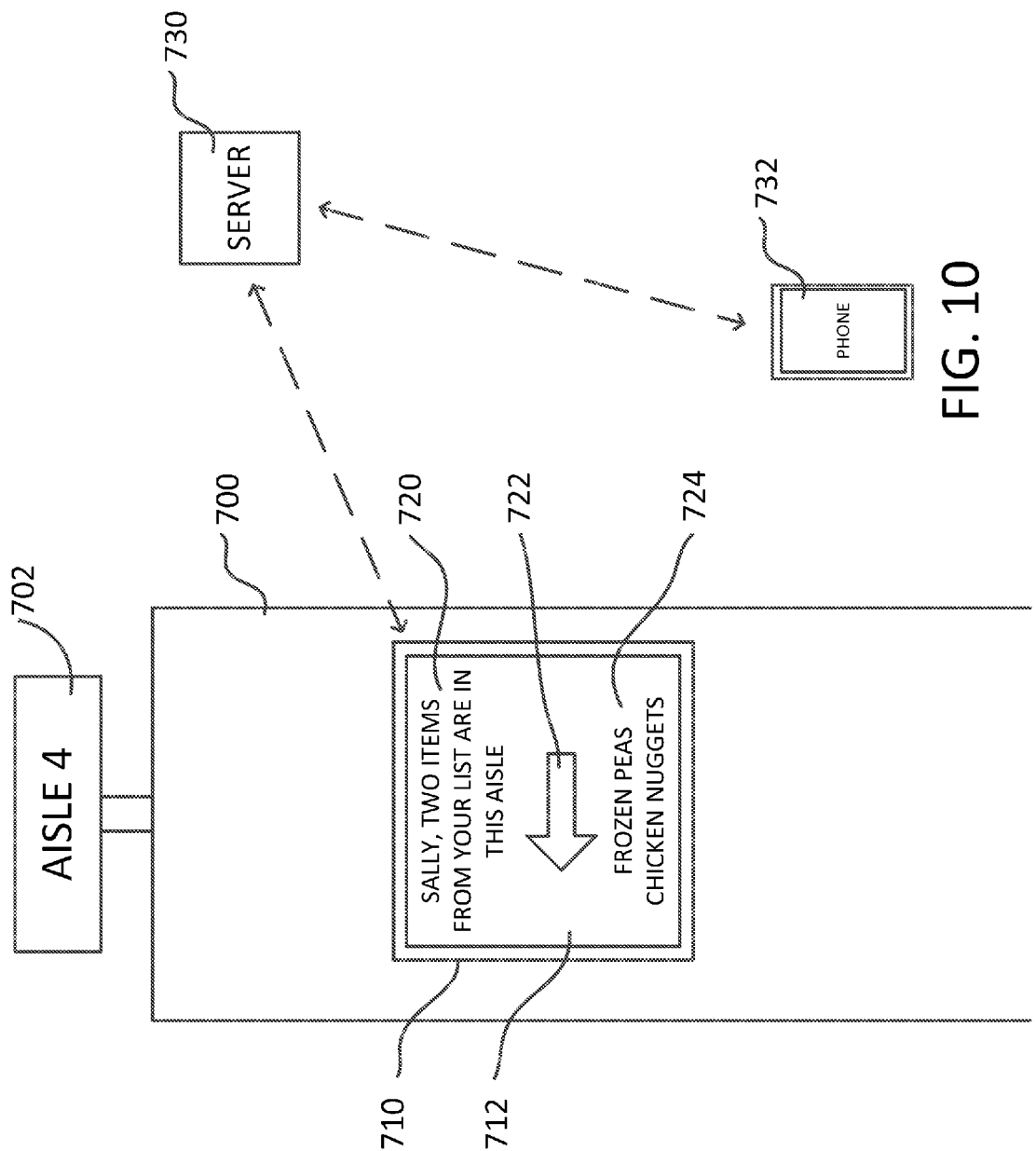
FIG. 10 is a schematic illustrating an exemplary stationary computing device affixed to a location within a store configured to provide directional and navigational instructions to a consumer related to an item being sought, according to some embodiments of the present disclosure.

FIG. 10 is a schematic illustrating an exemplary stationary computing device affixed to a location within a store configured to provide directional and navigational instructions to a consumer related to an item being sought. End 700 of a store shelf and aisle sign 702 are illustrated. A computerized device 710 is affixed to end 700. Device 710 includes display 712 and includes capabilities similar to a portable computerized device as disclosed herein. Portable computerized device 732 is illustrated in communication with remote server 730. Portable computerized device 732 can be carried by a consumer and relay a shopping list and a current location of the consumer to server 730. Server 730 is communication with device 710, and when device 732 is within a certain distance of device 710, device 710 can project graphics providing a direction to an item from the shopping list. Graphic 720 provides a salutation to attract the attention of the consumer in possession of device 732 and provides direction to items from her list. Graphic 722 provides a directional arrow conveying a direction that the consumer should walk. Graphic 724 provides the identities of items from the list for the consumer to look for. Filters can be applied to the display, for example, preventing a display from providing publically items from a list that a consumer may not want publically displayed, such as medication items.

Figure 8:
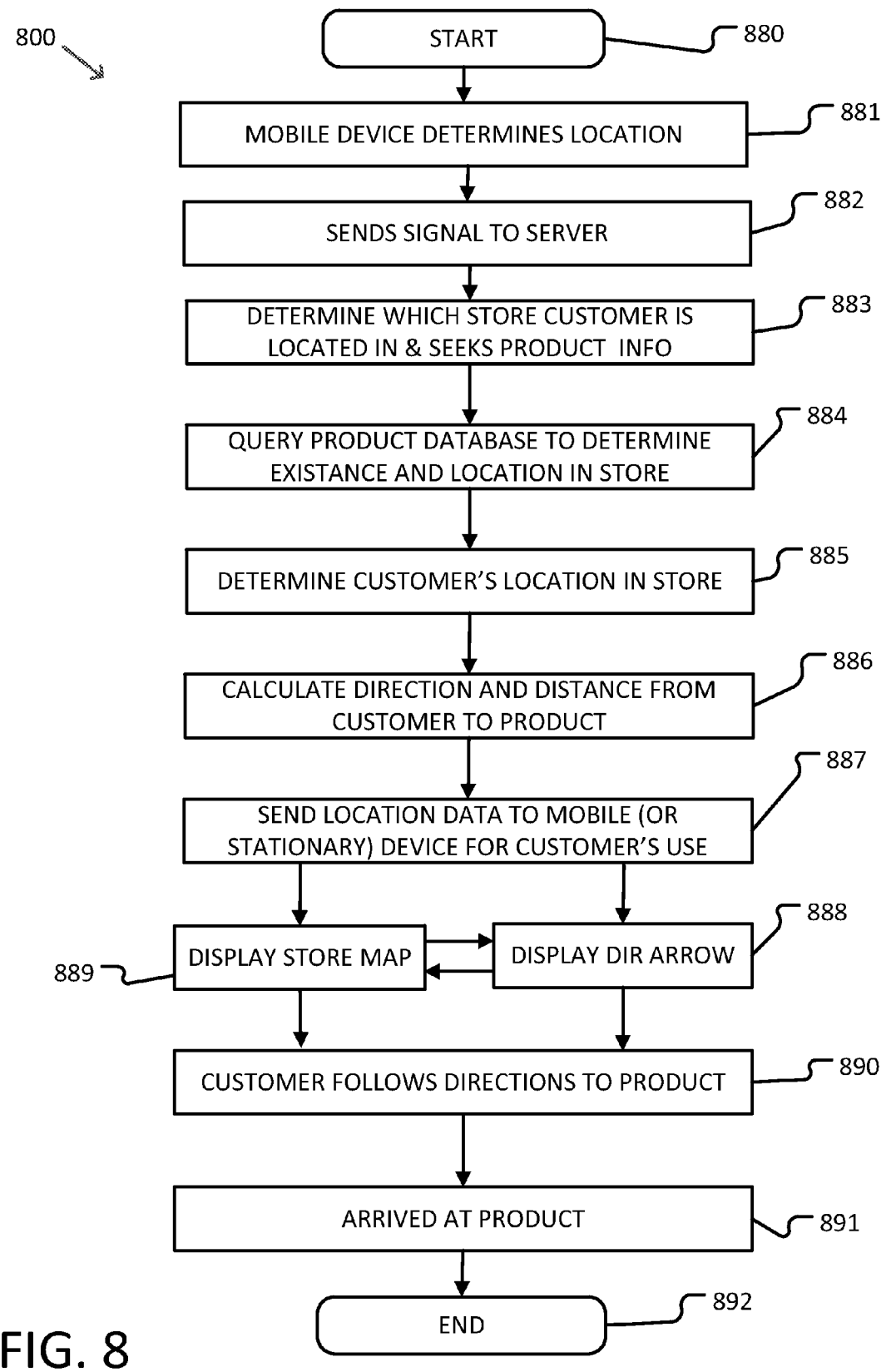
FIG. 8 is a flow chart illustrating an exemplary method demonstrating the decision process for finding a product in a store and providing it to a consumer utilizing a mobile device, according to some embodiments of the present disclosure.

FIG. 8 is a flowchart illustrating an exemplary process to locate a product of interest within a retail establishment with either a portable computerized device. Process 800 operates within a portable computerized device and begins at step 880. At step 881, the process monitors a location of the device within a retail store according to methods disclosed herein. At step 882, the device sends a signal to a product location index server via a wireless communication network. At step 883, the server queries the database to determine which store the customer is located at. At step 884, a product information database is referenced to determine the availability of the product and the location of the product within the retail establishment, according to methods disclosed herein. At 885, the server determines the customer's location within the retail establishment. At step 886, the customer's location within the store is determined and compared to that of the product and directional information is calculated. At step 887, this information is sent to the portable computerized device, according to methods disclosed herein. At step 888, the user displays a directional arrow that points towards the product of interest. Or, alternatively, the user my employ step 889 and view a map of the retail establishment with the product location and his or her location shown.

At step 890, the user of the device is follows the directions to the product. At step 891, the customer has arrived and a message flashes on the screen. At step 892, the process ends. The process illustrated is a non-limiting example. A number of exemplary processes are envisioned, including both stationary and mobile devices. When using the device, several exemplary screen displays are envisioned. The disclosure is not intended to be limited to the exemplary process provided.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer-implemented method comprising:
    receiving a position signal from a portable computerized device, wherein the portable computerized device comprises a processor, a computer screen, a transmitter, a receiver, a direction sensor, a position sensor, a distance sensor, a memory operably connected to the processor, and a product location application installed on the portable computerized device, the portable computerized device is located within a retail store, the position sensor is configured to generate the position signal, and the position signal is indicative of a portable computerized device location of the portable computerized device;
    receiving an identification of an identified product on a shopping list from the portable computerized device, the identification of the identified product on the shopping list being provided by a user of the portable computerized device using the product location application;

determining the portable computerized device location based on the position signal;

querying a store location database to identify the retail store from a plurality of retail stores based on determining the portable computerized device location;

referencing a product location database to determine an availability of the identified product within the retail store and an identified product location of the identified product within the retail store, wherein the product location database correlates a plurality of products offered for sale within the retail store locations of each product of the plurality of products within the retail store, and the plurality of products comprise the identified product;

comparing the portable computerized device location to the identified product location, wherein comparing the portable computerized device location to the identified product location comprises:

receiving a direction signal from the portable computerized device, wherein the direction sensor is configured to derive a direction that the user of the portable computerized device is facing and generate the direction signal, and the direction signal is indicative of the direction the user of the portable computerized device is facing;

receiving a distance signal from the portable computerized device, wherein the distance sensor is configured to detect a distance between the identified product and the portable computerized device and to generate the distance signal, and the distance signal is indicative of the distance between the identified product and the portable computerized device;

determining the direction that the user of the portable computerized device is facing based on the direction signal; and determining the distance between the identified product and the portable computerized device based on the distance signal; and sending location data over a communication network to the portable computerized device, wherein the location data causes the product location application to display the location data on the computer screen of the portable computerized device, and wherein displaying the location data by the product location application on the computer screen of the portable computerized device includes:

displaying by the product location application on the computer screen of the portable computerized device a graphic pointing directly to the identified product location of the identified product with respect to the portable computerized device;

actively generating by the product location application on the computer screen of the portable computerized device other graphics that remain oriented to the portable computerized device as the portable computerized device is moved and changes orientation; and flashing a message by the product location application on the computer screen of the portable computerized device when the portable computerized device arrives at the identified product location of the identified product.

2. The computer-implemented method of claim 1, wherein displaying the location data by the product location application on the computer screen of the portable computerized device further includes:

displaying by the product location application on the computer screen of the portable computerized device a number quantifying the distance between the identified product and the portable computerized device.

3. The computer-implemented method of claim 1, wherein displaying the location data by the product location application on the computer screen of the portable computerized device further includes:

displaying by the product location application on the computer screen of the portable computerized device navigational instructions providing information about turns to traverse within the retail store to get from the portable computerized device location to the identified product location.

4. The computer-implemented method of claim 1, wherein displaying the location data by the product location application on the computer screen of the portable computerized device further includes:

displaying by the product location application on the computer screen of the portable computerized device a number quantifying a navigational distance between the identified product and the portable computerized device.

5. A computerized system comprising:

a product location index server comprising a first processor and a first memory operably connected to the first processor; and a portable computerized device comprising a second processor, a computer screen, a transmitter, a receiver, a direction sensor, a position sensor, a distance sensor, a second memory operably connected to the second processor, and a product location application installed on the portable computerized device;

wherein:

the portable computerized device is configured to communicate with the product location index server via a communication network;

the position sensor is configured to generate a position signal indicative of a portable computerized device location of the portable computerized device;

the direction sensor is configured to derive a direction that a user of the portable computerized device is facing and to generate a direction signal that is indicative of the direction that the user of the portable computerized device is facing;

the distance sensor is configured to detect a distance between an identified product and the portable computerized device and to generate a distance signal that is indicative of the distance between the identified product and the portable computerized device;

the first memory stores:

a product location database correlating a plurality of products offered for sale within a retail store to locations of each product of the plurality of products within the retail store, the plurality of products comprising the identified product;

the second memory stores:

a shopping list module configured to cause the second processor to receive an identification of the identified product on a shopping list, the identification of the identified product on the shopping list being provided by the user of the portable computerized device using the product location application; and the first memory further stores:

an in-store navigation instruction module configured to cause the first processor to:

receive the position signal from the portable computerized device, the portable computerized device being located within the retail store;

receive the identification of the identified product from the portable computerized device;

determine the portable computerized device location based on the position signal;

query a store location database to identify the retail store from a plurality of retail stores based on determining the portable computerized device location;

reference the product location database to determine an availability of the identified product within the retail store and an identified product location of the identified product within the retail store;

compare the portable computerized device location to the identified product location, wherein comparing the portable computerized device location to the identified product location comprises:

receiving the direction signal from the portable computerized device;

receiving the distance signal from the portable computerized device;

determining the direction that the user of the portable computerized device is facing based on the direction signal; and determining the distance between the identified product and the portable computerized device based on the distance signal; and send location data over the communication network to the portable computerized device, wherein the location data causes the product location application to display the location data on the computer screen of the portable computerized device, and wherein displaying the location data by the product location application on the computer screen of the portable computerized device includes:

displaying by the product location application on the computer screen of the portable computerized device a graphic pointing directly to the identified product location of the identified product with respect to the portable computerized device;

actively generating by the product location application on the computer screen of the portable computerized device other graphics that remain oriented to the portable computerized device as the portable computerized device is moved and changes orientation; and flashing a message by the product location application on the computer screen of the portable computerized device when the portable computerized decide arrives at the identified product location of the identified product.

6. The computerized system of claim 5, wherein the identification of the identified product on the shopping list comprises a real-time direct product query.

7. The computerized system of claim 5, wherein the first memory further stores the store location database.

* * * * *